United States Patent
Nouvel et al.

(10) Patent No.: US 12,260,218 B2
(45) Date of Patent: Mar. 25, 2025

(54) CRACKING INSTRUCTIONS INTO A PLURALITY OF MICRO-OPERATIONS

(71) Applicant: Arm Limited, Cambridge (GB)

(72) Inventors: Quentin Éric Nouvel, Antibes (FR); Luca Nassi, Antibes (FR); Nicola Piano, Antibes (FR); Albin Pierrick Tonnerre, Nice (FR); Geoffray Matthieu Lacourba, Nice (FR)

(73) Assignee: Arm Limited, Cambridge (GB)

( * ) Notice: Subject to any disclaimer, the term of this patent is extended or adjusted under 35 U.S.C. 154(b) by 89 days.

(21) Appl. No.: 18/343,294

(22) Filed: Jun. 28, 2023

(65) Prior Publication Data
US 2025/0004769 A1  Jan. 2, 2025

(51) Int. Cl.
  *G06F 9/30* (2018.01)
  *G06F 9/38* (2018.01)

(52) U.S. Cl.
  CPC ...... *G06F 9/30145* (2013.01); *G06F 9/30098* (2013.01); *G06F 9/3017* (2013.01); *G06F 9/3826* (2013.01)

(58) Field of Classification Search
  CPC ............. G06F 9/30145; G06F 9/30098; G06F 9/3017; G06F 9/3826
  See application file for complete search history.

(56) References Cited

U.S. PATENT DOCUMENTS

| | | | | |
|---|---|---|---|---|
| 6,728,869 | B1 * | 4/2004 | Mang | G06F 9/3001 |
| | | | | 712/E9.046 |
| 8,495,341 | B2 * | 7/2013 | Busaba | G06F 9/3017 |
| | | | | 712/225 |
| 8,938,605 | B2 * | 1/2015 | Busaba | G06F 9/30181 |
| | | | | 712/209 |
| 9,946,547 | B2 * | 4/2018 | Yu | G06F 9/3834 |
| 2003/0177312 | A1 * | 9/2003 | Baktha | G06F 9/3838 |
| | | | | 711/168 |
| 2015/0058604 | A1 * | 2/2015 | Arunagiri | G06F 11/3684 |
| | | | | 712/227 |
| 2017/0017490 | A1 | 1/2017 | Caulfield | |
| 2020/0310799 | A1 * | 10/2020 | Hsu | G06F 9/3828 |
| 2022/0197791 | A1 * | 6/2022 | Chadwick | G06F 11/0751 |

* cited by examiner

*Primary Examiner* — Shawn Doman
(74) *Attorney, Agent, or Firm* — NIXON & VANDERHYE P.C.

(57) ABSTRACT

There is provided an apparatus, method for data processing. The apparatus comprises post decode cracking circuitry responsive to receipt of decoded instructions from decode circuitry of a processing pipeline, to crack the decoded instructions into micro-operations to be processed by processing circuitry of the processing pipeline. The post decode cracking circuitry is responsive to receipt of a decoded instruction suitable for cracking into a plurality of micro-operations including at least one pair of micro-operations having a producer-consumer data dependency, to generate the plurality of micro-operations including a producer micro-operation and a consumer micro-operation, and to assign a transfer register to transfer data between the producer micro-operation and the consumer micro-operation.

20 Claims, 10 Drawing Sheets

CRACKING INSTRUCTIONS INTO A PLURALITY OF MICRO-OPERATIONS

TECHNICAL FIELD

The present invention relates to data processing. More particularly the present invention relates to an apparatus, a method, and a non-transitory computer readable storage medium.

BACKGROUND

Some data processing apparatuses are arranged to crack instructions into a plurality of micro operations suitable for processing by processing circuitry of a processing pipeline.

SUMMARY

According to some configurations of the present techniques there is provided an apparatus comprising:
post decode cracking circuitry responsive to receipt of decoded instructions from decode circuitry of a processing pipeline, to crack the decoded instructions into micro-operations to be processed by processing circuitry of the processing pipeline,
wherein the post decode cracking circuitry is responsive to receipt of a decoded instruction suitable for cracking into a plurality of micro-operations including at least one pair of micro-operations having a producer-consumer data dependency, to generate the plurality of micro-operations including a producer micro-operation and a consumer micro-operation, and to assign a transfer register to transfer data between the producer micro-operation and the consumer micro-operation.

According to some configurations of the present techniques there is provided a method of operating an apparatus, the method comprising:
in response to receipt of decoded instructions from decode circuitry of a processing pipeline, cracking the decoded instructions into micro-operations to be processed by processing circuitry of the processing pipeline,
in response to receipt of a decoded instruction suitable for cracking into a plurality of micro-operations including at least one pair of micro-operations having a producer-consumer data dependency, generating the plurality of micro-operations including a producer micro-operation and a consumer micro-operation, and assigning a transfer register to transfer data between the producer micro-operation and the consumer micro-operation According to some configurations of the present techniques there is provided a non-transitory computer readable storage medium to store computer-readable code for fabrication of an apparatus comprising:
post decode cracking circuitry responsive to receipt of decoded instructions from decode circuitry of a processing pipeline, to crack the decoded instructions into micro-operations to be processed by processing circuitry of the processing pipeline,
wherein the post decode cracking circuitry is responsive to receipt of a decoded instruction suitable for cracking into a plurality of micro-operations including at least one pair of micro-operations having a producer-consumer data dependency, to generate the plurality of micro-operations including a producer micro-operation and a consumer micro-operation, and to assign a transfer register to transfer data between the producer micro-operation and the consumer micro-operation.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
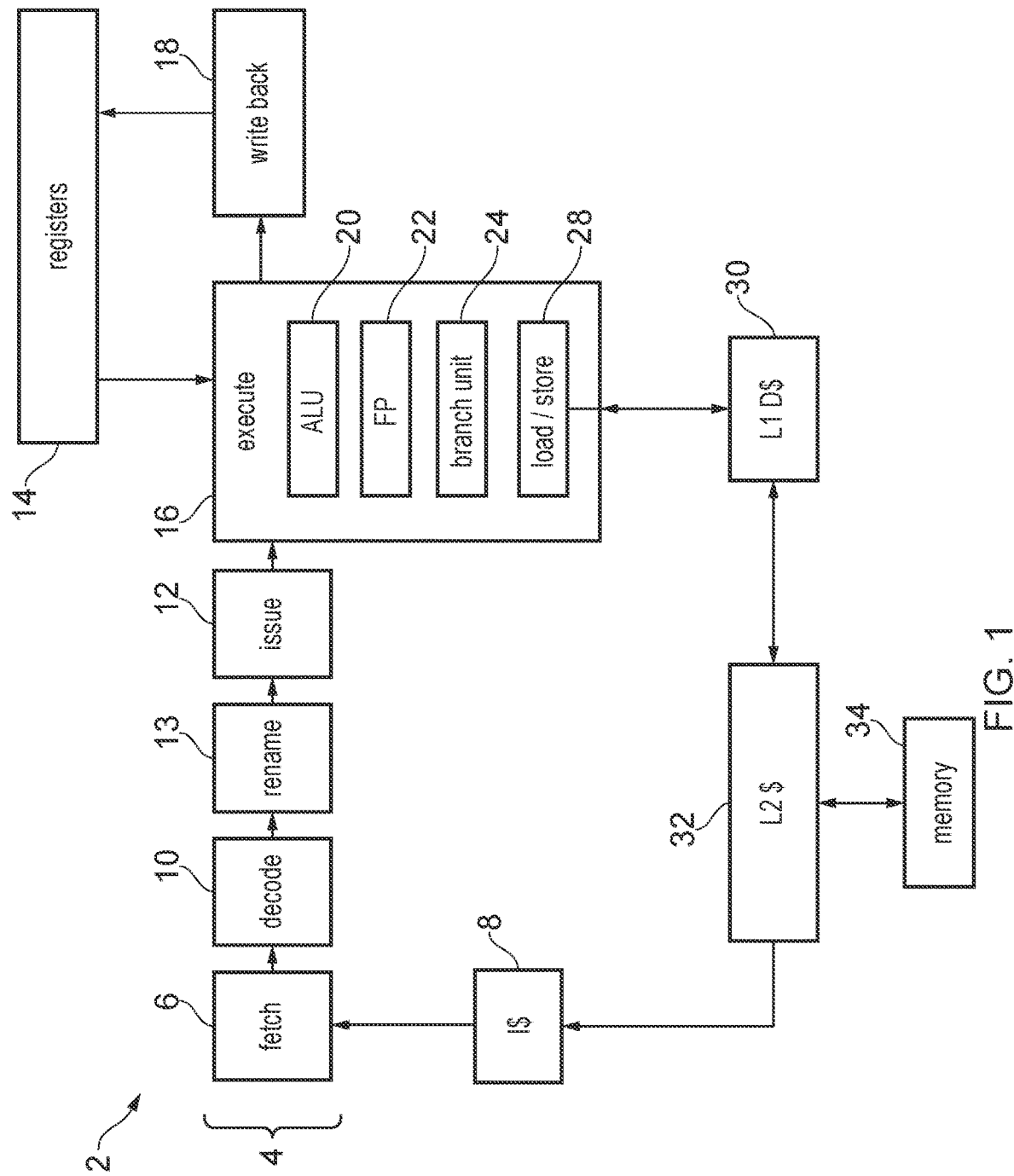
FIG. 1 schematically illustrates a data processing apparatus according to some configurations of the present techniques.

Before discussing the configurations with reference to the accompanying figures, the following description of configurations is provided.

Some data processing apparatuses are provided with a processing pipeline having several stages. Such processing pipelines may comprise decode circuitry that is configured to decode instructions of an instruction set architecture (ISA) into one or more decoded instructions that are each passed to processing circuitry in one or more subsequent stages of the processing pipeline. The splitting of instructions of the instruction set architecture into plural instructions is referred to as cracking. Cracking of instructions may be performed to split more complex instructions into several instructions which each require less complex processing circuitry than the original processing instruction.

Cracking instructions at the decode stage may include tracking each of the decoded instructions and any corresponding data dependencies through each subsequent stage of the pipeline in order to avoid the introduction of data hazards and, for processing pipelines which operate as out-of-order pipelines, to ensure that the cracked instructions are committed in strict program counter order. Tracking the decoded instructions through the pipeline may be achieved using resources to be assigned to track data dependencies between the decoded instructions. The resources remain associated with those decoded instructions until the time at which those decoded instructions commit.

In some configurations there is provided an apparatus comprising post decode cracking circuitry responsive to receipt of decoded instructions from decode circuitry of a processing pipeline, to crack the decoded instructions into micro-operations to be processed by processing circuitry of the processing pipeline. The post decode cracking circuitry is responsive to receipt of a decoded instruction suitable for cracking into a plurality of micro-operations including at least one pair of micro-operations having a producer-consumer data dependency, to generate the plurality of micro-operations including a producer micro-operation and a consumer micro-operation, and to assign a transfer register to transfer data between the producer micro-operation and the consumer micro-operation.

The post decode cracking circuitry may be provided at any stage of the processing pipeline that is downstream from the decode stage (i.e., is encountered by the decoded instructions subsequent to passing through the decode stage). Cracking instructions subsequent to the decode stage is referred to herein as late cracking or post decode cracking.

Some cracked instructions may have a producer-consumer data relationship in which a decoded instruction is split into two or more micro operations for which one of those micro operations is a producer micro operation and one is a consumer micro operation. The producer micro operation produces data required by the consumer micro-operation. The late cracking of decoded instructions into micro-operations has previously been viewed as involving too much additional complexity associated with tracking the dependency. The inventors have realised that by providing post decode cracking circuitry that assigns a transfer register, the dependency can be tracked through the pipeline whilst reducing the number of decoded instruction slots that need to be occupied by those instructions in stages between the decode circuitry and the post decode cracking circuitry.

The transfer register may be variously provided. For example, the transfer register may be provided as one or more dedicated registers that is maintained by the post decode cracking circuitry.

In some configurations the apparatus is provided with a plurality of physical registers; and the post decode cracking circuitry comprises register renaming circuitry to dynamically select a subset of the plurality of physical registers to map to a set of architecturally defined registers for storing data values identifiable by the decoded instructions, wherein the transfer register is one of the plurality of physical registers. The plurality of physical registers may comprise a greater number of registers than the set of architecturally defined registers. The register renaming circuitry can assign multiple instances of the same architectural register to different ones of the plurality of physical registers. For example, different instructions may each identify a same architectural register to be used at different times in a program and to hold different, and possibly unrelated, operands. By assigning a different physical register to each of the multiple instances of the same architectural register, the register rename circuitry can enable each of the multiple instances to be active within the pipeline at a same time. By utilising one of the plurality of physical registers as the transfer register, the post decode cracking circuitry can make use of existing structures of the pipeline to assign and maintain the transfer register. The register renaming circuitry may be provided as a discrete circuitry block within the post decode cracking circuitry. Alternatively, the post decode cracking circuitry and the register renaming circuitry may be provided as one or more discrete blocks of circuitry having the function of the register renaming circuitry and the post decode cracking circuitry.

The assignment of the plurality of physical registers to the set of architectural registers can be maintained using any register renaming scheme known to the person of ordinary skill in the art. In some configurations the register rename circuitry is configured to maintain a speculative mapping between the set of architecturally defined registers and the plurality of physical registers, and to maintain register commit information identifying which of the plurality of physical registers are protected against reallocation to a different architecturally defined register; and the post decode cracking circuitry configured to assign a given physical register of the plurality of physical registers that is not, at a time of assignment, protected against reallocation as the transfer register and to identify the given physical register in the register commit information. The speculative mapping may be stored as a speculative rename table defining a mapping between the architecturally defined registers and the set of architecturally defined registers at the time at which the physical registers are assigned to the architectural registers. The register commit information may comprise a free list which maintains, for each physical register, an indication as to whether that physical register is currently protected against reallocation (assigned to either to one of the architectural registers as a transfer register) or whether that physical register is free (available for assignment to one of the architectural registers or as a transfer register). The register commit information may also comprise a register commit queue (RCQ) which records a sequence of updates to the register mappings associated with destination registers identified in the decoded instructions. Hence, each time a decoded instruction passes through the rename circuitry, the corresponding mapping (or mappings) between one of the plurality of physical registers and the set of architectural registers used as destination registers is allocated to the register commit queue. The post decode cracking circuitry is configured, at a time of assignment of the transfer register, to select a physical register that is marked as free in the register commit information (e.g., is marked as free in the free list) to be assigned as the transfer register and to protect that register against further reallocation, e.g., by marking it as protected in the free list and by indicating the assignment of that physical register as a transfer register in the register commit queue.

The producer-consumer relationship between the pair of micro operations may either require that the data transferred between the pair of micro-operations is retained subsequent to execution of the pair of micro operations or that the data transferred between the pair of micro operations is exclusively used by the consumer micro-operation. In some configurations the register rename circuitry is responsive to identification that the decoded instruction is of a type for which the data transferred between the pair of micro-operations will not be required subsequent to execution of the consumer micro-operation, to omit assignment of the given physical register in the speculative mapping. The allocation of the given physical register to one of the architectural registers may therefore be omitted. Hence, from the point of view of the speculative mapping, the transfer register is not mapped to any architectural register. This reduces the number of times the architectural registers need to be reallocated and, hence, the overhead associated with assigning the transfer register. Where the transfer register is not mapped to any architectural register, the mapping between the transfer register and the physical register to which it is assigned may be recorded in the register commit queue using, for example, a dummy architectural register indicator identifying a register number that does not correspond to one of the architectural registers. Furthermore, because no architectural register is assigned in the mapping, the resources used by the late cracked instructions can be assigned later in the processing pipeline and can be freed earlier than they would be if the same instruction was cracked at the decode stage. In particular, the transfer register need only be assigned to the micro operations having a producer-consumer data dependency and the corresponding physical register can be freed at the point where those micro operations are committed.

In some configurations the post decode cracking circuitry is responsive to identification that the decoded instruction is of a type for which the data transferred between the pair of micro-operations is required subsequent to execution of the consumer micro-operation, to identify in the speculative mapping an architectural register of the set of architecturally defined registers to be mapped to the transfer register. Identifying an architectural register being mapped to the transfer register results in the transfer register being accessible by a further micro operation in addition to the consumer micro operation.

In some configurations the apparatus comprises commit circuitry configured to track progress of the decoded instructions until the decoded instructions have been committed. The commit circuitry may be provided as a distinct block of circuitry in addition to the post decode cracking circuitry. Alternatively, the post decode cracking circuitry and the commit circuitry may be provided as one or more blocks of circuitry that function as both the post decode cracking circuitry and the commit circuitry. Tracking progress of the decoded instructions may comprise recording progress of each of the decoded instructions through one or more stages of the processing pipeline and/or tracking which of the decode instructions has completed execution by processing circuitry within the processing pipeline and is ready to be committed (for example, once all instructions that appear before those decoded instructions in program counter order have committed).

In some configurations tracking the progress of the decoded instruction comprises tracking progress of a subset of the plurality of micro-operations. The subset of instructions may comprise micro operations associated with each decoded instruction. Alternatively, the subset may be a strict subset of instructions excluding one or more of the micro operations associated with the decoded instructions. Tracking only a subset of the plurality of micro operations reduces the overhead associated with cracking the decoded instructions into a plurality of micro operations.

In some configurations the subset comprises at least the consumer micro-operation. The consumer micro operation is dependent on the completion of the producer micro operation. Hence, tracking the consumer micro operation enables completion of the operations associated with the decoded instructions to be tracked.

In some configurations the subset excludes the producer micro-operation. Due to the producer consumer relationship between the producer micro operation and the consumer micro operation, the consumer micro operation cannot complete without the producer operation first executing. It is therefore possible to track progress of the micro operations whilst not explicitly tracking the producer micro operation. As a result a greater number of micro operations can be tracked per decoded instruction because the producer micro operation doesn't require explicit tracking. This can help conserve bit space within the tracking structure.

In some configurations the commit circuitry is configured to treat resolution of the consumer micro-operation as an implicit indication that the producer micro-operation has resolved. Resolution of an operation refers to the completion of processing of the operation, which may occur out of program counter order. Once an operation has resolved it is recorded in a commit queue indicative of instructions that have resolved but not yet committed. Instructions which have resolved may commit in strict program counter order. Therefore resolved instructions will remain in the commit queue until all instructions that occur earlier in program counter order have committed. Because the consumer micro operation uses data that is produced by the producer micro operation, the consumer micro operation cannot resolve until the producer micro operation has resolved. Therefore, the commit circuitry can exclude tracking of the producer micro operation and make use of the knowledge that the producer and consumer micro operation are being executed with the producer micro operation executing before the consumer micro operation and that the consumer micro operation is dependent on the producer operation to infer that, when the consumer micro operation resolves, the producer micro operation must also have resolved. As a result, each pair of micro operations having a producer-consumer data operation can be tracked as a single micro operation rather than as two micro operations reducing the overall amount of data that needs to be tracked by the commit circuitry.

In some configurations the commit circuitry is configured to maintain a resolved operation queue comprising a plurality of resolved operation queue entries, each of the plurality of resolved operation queue entries corresponding to one of the decoded instructions and maintaining a plurality of bits indicative of the progress of the subset corresponding to that one of the resolved operation queue entries. The resolved operation queue tracks resolution of each of the plurality of decoded instructions through the plurality of bits. The plurality of bits may comprise one bit per tracked micro operation of the plurality of micro operations that a particular one of the decoded instructions is cracked into. The commit circuitry may be configured to set each of the plurality of bits to a first value when the corresponding micro operation has not yet resolved and to set that one of the plurality of bits to a second value when the corresponding micro operation has resolved. For example, the first value may be a logical zero and the second value may be a logical one. Alternatively, the first value may be a logical one and the second value may be a logical zero. In some configurations, the plurality of bits may not have a one to one correspondence with the micro operations and the resolved micro operations may be encoded using a logical combination of the plurality of bits.

Whilst any number of bits could be used to comprise the plurality of bits, in some configurations the plurality of bits comprises N bits, where N is a positive integer, and the plurality of micro-operations comprises M micro-operations, where M is a positive integer greater than N. The resolution of each of the M micro operations can be encoded into the N bits. For example, a single one of the N bits may be used to track completion of the pair of micro operations having the producer consumer relationship. As a further example, N bits provides $2^N$ encodings, so could be used as a count of the number of resolved micro-operations, but as the producer/consumer micro-operations are implicitly tracked as a single micro-operation which do not need to be counted separately, this means that the N bits can actually indicate resolution of $M>2^N$ micro-operations including the producer/consumer micro-operations.

In some configurations the apparatus comprises a plurality of physical registers; and the post decode cracking circuitry comprises register renaming circuitry to dynamically select a subset of the plurality of physical registers to map to a set of architecturally defined registers for storing data values identifiable by the decoded instructions, wherein the transfer register is one of the plurality of physical registers, and wherein the commit circuitry is configured: to maintain an architectural mapping between the set of architecturally defined registers and the plurality of physical registers at a current commit point; and at a point at which the decoded instruction commits and in response to an indication that the transfer register is not mapped to one of the plurality of architecturally defined registers, to trigger release of the transfer register so that it can be reallocated. The indication that the transfer register is not mapped to one of the plurality of architecturally defined registers may comprise a dummy value in the register commit queue that is stored in place of an architectural register identifier and that takes a value that does not correspond to any of the architecturally defined registers. Because the transfer register is not mapped to an architecturally defined register, the commit circuitry can infer that, once the consumer instruction commits, the physical register that is assigned as the transfer register is no longer required and this physical register can therefore be freed earlier than would be the case if that physical register were mapped to an architectural register (in which case, the physical register would not be able to be freed until the architectural register to which it is mapped is subsequently mapped to a different physical register in the architectural mapping).

In some configurations the commit circuitry is configured: to maintain an architectural mapping between the set of architecturally defined registers and the plurality of physical registers at a current commit point; and at a point at which the decoded instruction commits and in response to an indication that the transfer register is mapped to one of the plurality of architecturally defined registers, to record a mapping between the transfer register and that one of the plurality of architecturally defined registers in the architectural mapping without triggering release of the transfer register for reallocation. Because the transfer register is mapped to one of the architecturally defined registers, the physical register that is used as the transfer register is recorded in the architectural mapping and is retained as a protected register in the free list until that architecturally defined register is subsequently, e.g., at a point at which a subsequent instruction commits, remapped to a different physical register in the architectural mapping.

Whilst, in some configurations, the processing apparatuses may only be provided with a single stage of cracking circuitry, i.e., the post decode cracking circuitry, in some configurations the decoder circuitry is responsive to receipt of each instruction of a sequence of architecturally defined instructions to generate one or more of the decoded instructions. In other words, both the decode circuitry and post decode cracking circuitry are each able to crack instructions. Instructions cracked at the decode stage may be referred to as macro-operations which can then be cracked into micro operations by the post decode cracking circuitry.

In some configurations the decoder circuitry is responsive to identification that at least one composite decoded instruction suitable for cracking by the post decode cracking circuitry can be generated from one of the sequence of architecturally defined instructions, to generate the composite decoded instruction corresponding to that one of the sequence of architecturally defined instructions and defer cracking of the composite decoded instruction to the post decode cracking circuitry. In other words, where an instruction could be cracked by either the decode circuitry or the post decode cracking circuitry, the cracking is deferred to the post decode cracking circuitry. This reduces the overhead of handling a greater number of macro-operations during the earlier stages of the pipeline and improves overall resource efficiency.

In some configurations the producer micro-operation is issued before the consumer micro-operation. The consumer micro operation may directly follow the producer micro operation in the pipeline or may comprise one or more intermediate micro-operations between the producer micro operation and the consumer micro operation.

In some configurations the apparatus is an out-of-order processing apparatus. The out-of-order processing apparatus may comprise one or more structures to manage the execution of processing instructions out of order as would be known to the person having ordinary skill in the art.

Particular configurations will now be described with reference to the figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate decoded instructions to be processed by remaining stages of the pipeline; a rename stage 13 to maintain a speculative mapping between a set of architecturally defined registers and a plurality of physical registers 14, and to maintain register commit information identifying which of the plurality of physical registers are protected against reallocation to a different architecturally defined register; an issue stage 12 for checking whether operands required for the micro-operations are available in the register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages.

The execute stage 16 includes a number of processing units, for executing different classes of processing operation. For example the execution units may include an arithmetic/logic unit (ALU) 20 for performing arithmetic or logical operations; a floating-point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. In this example the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

Figure 2:
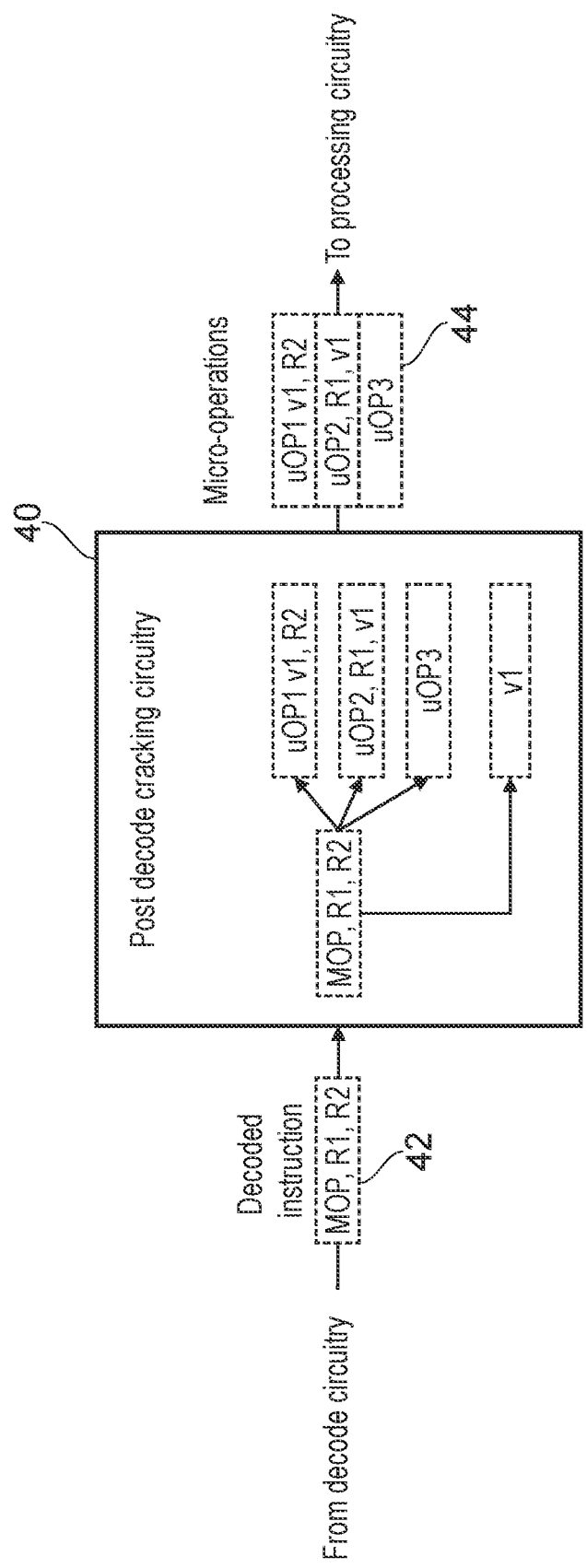
FIG. 2 schematically illustrates post decode cracking circuitry according to some configurations of the present techniques.

FIG. 2 schematically illustrates post decode cracking circuitry 40 according to some configurations of the present techniques. The post decode cracking circuitry may be positioned at any stage of the pipeline that is downstream from the decode circuitry 10, e.g., a stage upstream from the execution circuitry 16. In some examples, the post decode cracking circuitry may be provided at the rename stage 13.

The post decode cracking circuitry 40 is responsive to receipt of a decoded instruction 42 to crack the decoded instruction 42 into a plurality of micro operations 44. The decoded instruction 42 is a macro operation MOP that receives an operand from a register R2 and outputs a result to a register R1. In the illustrated configuration, the decoded instruction 42 is of a type that is recognised by the post decode cracking circuitry 40 as being suitable for cracking into a plurality of micro operations in which at least two of the micro operations uOP1 and uOP2 have a producer-consumer data relationship. The first micro operation, uOP1, is a producer micro operation that takes the operand in the register R2 and performs an operation that produces an output which is stored in a transfer register v1. The second micro operation, uOP2, is a consumer micro operation that consumes the operand (data value) stored in the transfer register v1 that is produced by the producer micro operation and outputs a result to the register R1. The plurality of micro operations also comprises a third micro operation uOP3 which does not depend on the value stored in the transfer register v1. The post decode cracking circuitry 40 is arranged to recognise the decoded instruction 42 as being one which can be decomposed as described above and to generate the micro operations uOP1, uOP2, and uOP3 and to assign a register as the transfer register. The micro operations 44 are then transmitted to processing circuitry which is downstream in the processing pipeline.

Figure 3:
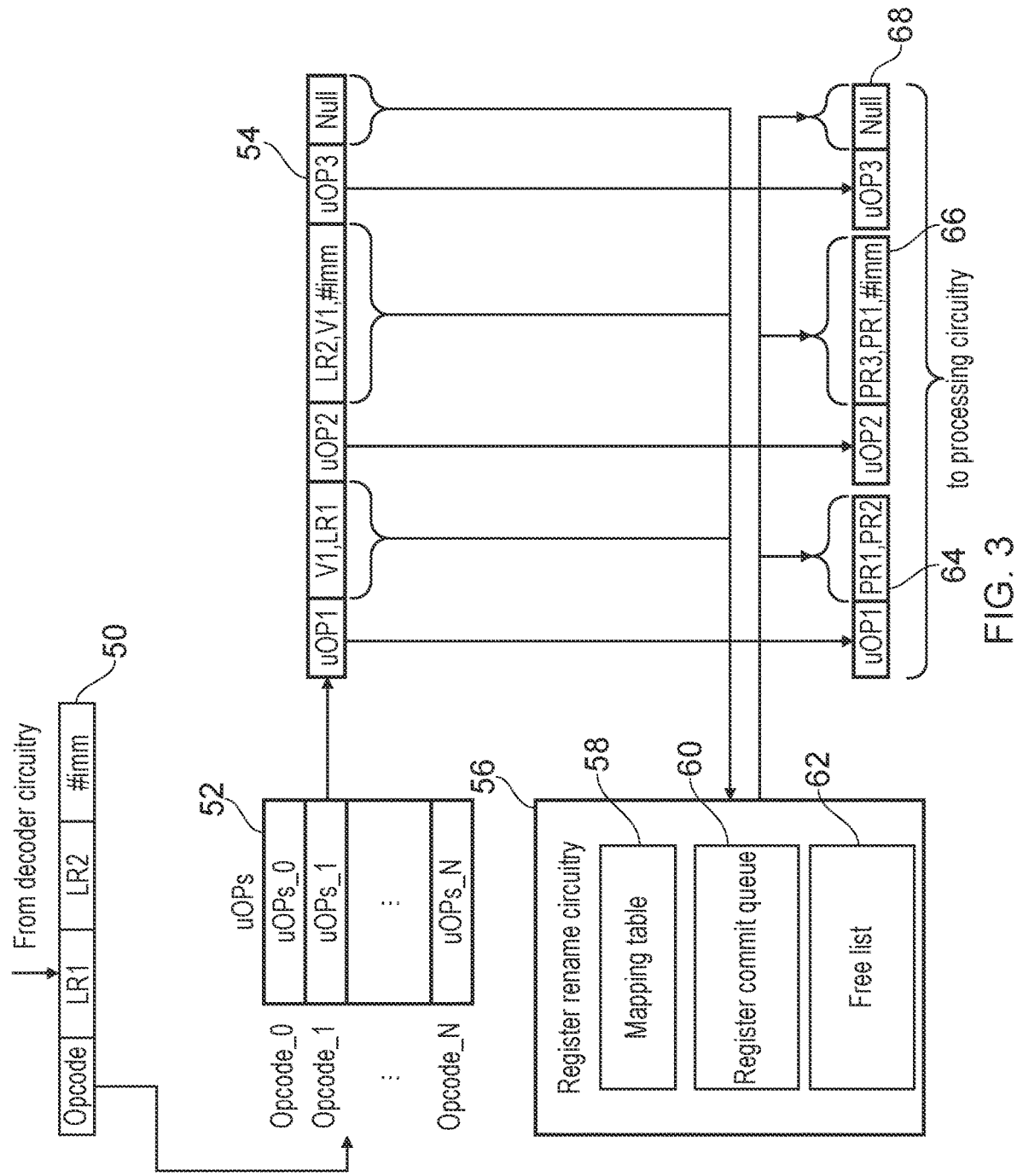
FIG. 3 schematically illustrates operations carried out in cracking instructions using post decode cracking circuitry.

FIG. 3 schematically illustrates the operation of the post decode cracking circuitry 40 according to some configurations of the present techniques. The post decode cracking circuitry receives a decoded instruction 50 from the decode circuitry. The decoded instruction 50 identifies the instruction type through an opcode, operands used as inputs of the instruction, and results produced by the instruction. In the illustrated example, the operands are identified as logical register 1 (LR1) and immediate value #imm, and the result is output to logical register 2 (LR2). The post decode cracking circuitry recognises whether the decoded instruction 50 is of a type that can be cracked into a plurality of micro operations based on the opcode that is received. For example, the post decode cracking circuitry may recognise that different types of opcode (e.g., opcode_0, opcode_1, . . . , opcode_N) can be split into different micro operations (e.g., uOPs_0, uOPs_1, . . . , uOPs_N) as illustrated schematically by uOPs table 52. It would be readily apparent to the skilled person that the post decode cracking circuitry would not necessarily store this information in a lookup table, but rather behaviour for specific opcodes (or portions of opcodes) may be hardwired into the post decode cracking circuitry such that the post decode cracking circuitry is responsive to receipt of those opcodes to generate the corresponding micro operations.

The post decode cracking circuitry cracks (splits or decomposes) the decoded instruction 50 into a sequence of micro operations 54. In the illustrated configuration, the decoded instruction 50 is cracked into a first micro operation uOP1 which outputs a result to a virtual (transfer) register V1 and a receives, as an operand, logical register LR1; a second micro operation uOP2 which outputs a result to logical register LR2, and receives, as operands, virtual (transfer) register V1, and the immediate value #imm; and a third micro operation uOP3 which has no operands or outputs to physical registers. The post decode cracking circuitry also identifies that the micro operations uOP1 and uOP2 have a producer consumer data relationship with data being transferred between uOP1 and uOP2 via the virtual (transfer) register V1. Indication of the dependencies is passed to the register rename circuitry 56 which maintains a speculative mapping table 58, a register commit queue 60, and a free list 62 which will be described in detail in relation to FIG. 4 below. The register rename circuitry 56 generates a mapping between the logical and virtual (transfer) registers of the sequence of micro operations 54, and a subset of the physical registers that are referenced by the processing circuitry when processing the micro operations.

In the illustrated example, registers indicated in the sequence of micro operations 54 are remapped to a set of physical registers. In particular V1 is mapped to physical register PR1, logical register LR1 is mapped to physical register PR2, and logical register LR2 is mapped to physical register PR3. The result of the mapping is a remapped sequence of micro-operations comprising a first micro operation 64 that outputs a result to physical register PR1, and receives physical register PR2 as an operand; a second micro operation 66 that outputs a result to physical register PR3, and receives physical register PR1 and the immediate value #imm as operands; and micro operation 3 having no register or immediate value dependencies. The remapped first micro operation 64, second micro operation 66, and third micro operation 68 are then passed to processing circuitry that is downstream in the processing pipeline.

In some alternative configurations, the sequence of uOPs 54 may not be explicitly generated in the pipeline. Instead, the rename circuitry/post decode cracking circuitry may generate the remapped micro operations 64, 66, 68 directly from the decoded instruction 50 without the intervening mapping step to generate the sequence of micro operations 54.

Figure 4:
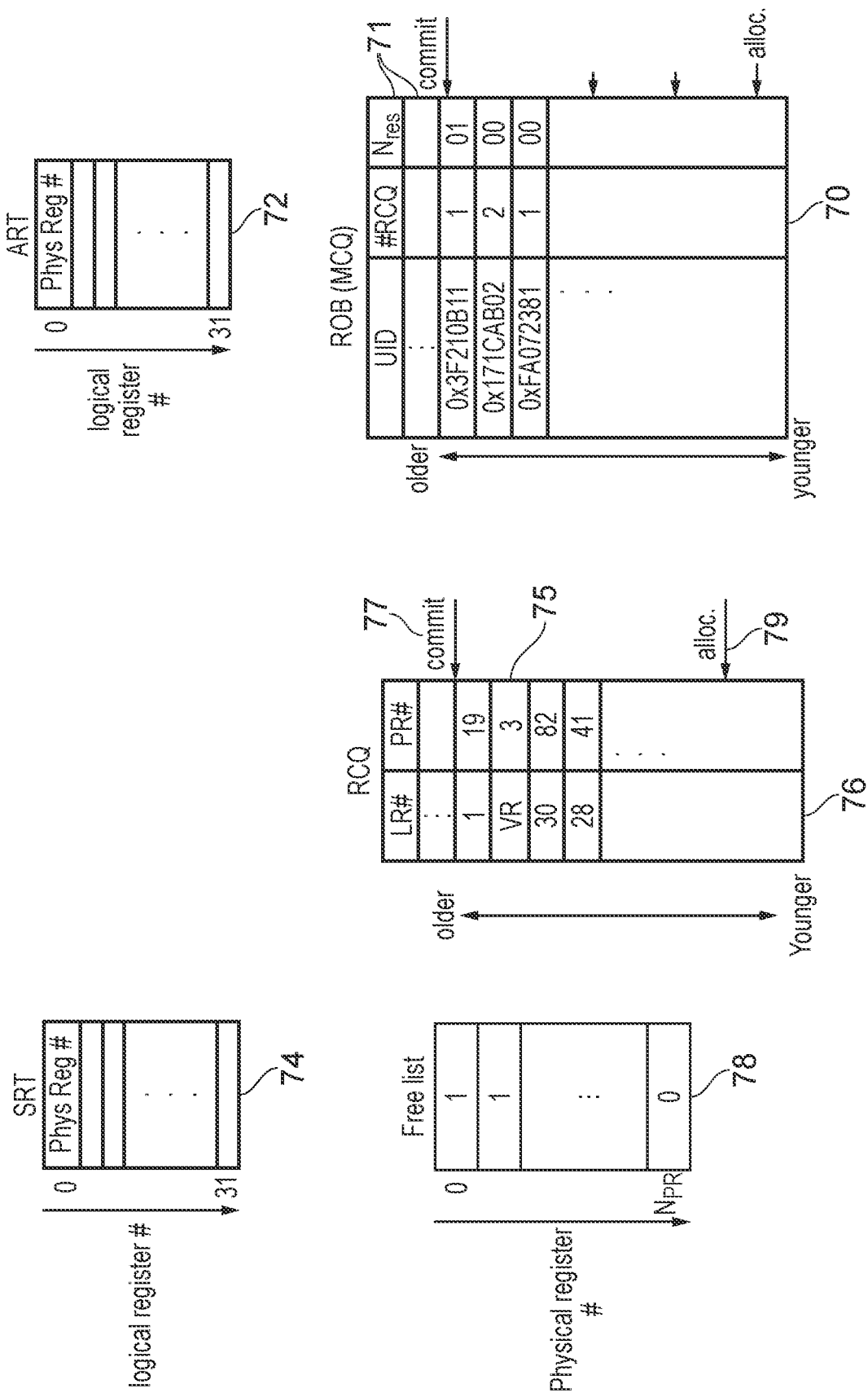
FIG. 4 schematically illustrates tables used to track register assignment.

FIG. 4 schematically illustrates further details of tables maintained by the apparatus in order to track the allocation of physical registers by the register rename circuitry. In particular, FIG. 4 illustrates a reorder buffer 70 (ROB, which can also be referred to as micro-operation commit queue or MCQ), and the rename state information which includes an architectural rename table (ART) 72, a speculative rename table (SRT) 74, a register commit queue (RCQ) 76, and a free list 78. These will each be described in more detail below.

The ART 72 represents the non-speculative logical-to-physical register mappings which were current at the time of processing a decoded instruction at the commit point, which is the last decoded instruction which is known to have been correctly executed. The ART is a table indexed by logical register number, where each entry specifies the corresponding physical register number which is mapped to that logical register number.

The SRT 74 represents the current speculative logical-to-physical register mappings which are active at the allocation point which represents the most recent decoded instruction which has been renamed speculatively. The mappings in the SRT are used for controlling the register mappings that are assigned to speculatively executed micro operations that are generated from the decoded instructions, while the ART is a backup in case previous mappings need to be restored to handle a misprediction. The SRT 74 has the same format as the ART 72, again comprising an indexed set of entries which are indexed based on logical register number and each specify a corresponding physical register number. In this example the number of logical registers is 32, so that the ART and SRT each comprise 32 entries, but it will be appreciated that is just one example and other architectures may support a greater or smaller number of logical registers.

The free list 78 identifies physical registers that are currently protected against reallocation, for example, because they are already mapped to an architectural register or to a transfer register. The free list 78 is indexed by the physical register number and contains a field (e.g. a single bit) indicative of whether the each physical register is currently free for allocation or is protected against reallocation. In the illustrated example, physical registers 0 and 1 each have a value of 1 indicating that they are free to be allocated. On the other hand, physical register NPR has a value of 0 indicating that it is protected and, hence, is not available for reallocation. It would be readily apparent to the skilled person that, in alternative configurations, a logical 0 could be used to indicate that the physical register is free for allocation and a logical 1 could be used to indicate that the physical register is protected against allocation.

When a given decoded instruction reaches the rename stage 13, a new logical-to-physical register mapping is generated by the rename stage 13 for each destination logical register required by that decoded instruction. Most decoded instructions may specify only a single destination register, but there could be some decoded instructions that may specify more than one logical register as a destination register. The destination register is a register to be written to in response to the decoded instructions, as opposed to source registers which provide operands for being processed by the decoded instruction to determine the result to be written to the destination register. Hence, for each destination logical register specified by the decoded instruction, the rename stage 13 selects an available physical register which is identified in the free list as being available for allocation, and writes the physical register number of the selected physical register to the entry of the SRT 74 which corresponds to the logical register specified as the destination. The new logical-to-physical register mapping is written to the RCQ 76 in the next entry after the last allocated RCQ entry. An allocation pointer 79 indicates the allocation point at which the next RCQ entry is to be allocated, and is updated to point to the next entry each time an RCQ entry is allocated. Hence the RCQ 76 is effectively an ordered queue of successive updates to the speculative register mappings in the SRT 74. The RCQ 76 can provide a full history of changes to the SRT 74 going back to the commit point. Each entry of the RCQ specifies a logical register number and the corresponding physical register number to which that logical register number was remapped by the rename stage 13. Also, when a new logical-to-physical register mapping is recorded in the SRT, the physical register identified by the logical-to-physical register mapping is marked as protected against allocation in the free list to prevent the rename circuitry attempting to allocate that physical register until it is subsequently freed.

Also, when the rename stage 13 allocates a new physical register to a particular logical register in response to a given decoded instruction, an entry for that decoded instruction is also assigned to the reorder buffer (ROB) 50 which specifies a decoded instruction ID (UID) uniquely identifying that decoded instruction and a count value 51 which identifies how many new entries were allocated to the RCQ in response to that decoded instruction. In other words the count value 51 indicates how many destination registers were specified by the decoded instruction having the corresponding UID. Hence, in the example of FIG. 3 the reorder buffer is indicating that the oldest decoded instruction in the queue specified one destination register, the next decoded instruction specified two destination registers, and the next decoded instruction specified one destination register. Both the RCQ 76 and the reorder buffer (ROB) 50 store their entries in age order, for example with pointers representing the commit point and the allocation point.

Decoded instructions have their entries retained in the ROB 50 at least until they are committed (it is possible they may be retained for longer than that depending on how long it takes for the corresponding entry to be overwritten after the commit point has overtaken that decoded instruction). A decoded instruction can be committed in program counter order when any preceding decoded instructions have committed and micro operations associated with the decoded instruction have resolved. When a decoded instruction is committed the commit pointer can be incremented in the ROB to pass beyond the committed decoded instruction to indicate that the corresponding ROB entry can now be overwritten. Also, when a decoded instruction is committed the speculative register mappings which were made in the SRT 74 when that committed decoded instruction was renamed by the rename stage 13 are written to the ART 72. This is done by checking the count value 51 associated with the entry of the ROB for the committed decoded instruction, and then reading the number of RCQ entries indicated by the count value 51 from the RCQ 76, starting at the location of a RCQ commit pointer 77 (the RCQ commit pointer can then be incremented by the number of entries specified by the count value 51). Hence, if the committed decoded instruction only had one destination then a single RCQ entry is read from the RCQ and the corresponding logical-to-physical register mapping is written into the ART 72. Decoded instructions which have two or more destination registers would have two or more entries read from the RCQ when the decoded instruction is committed and this may result in multiple mappings changing in the ART 72.

Hence, the reorder buffer 50 tracks the speculatively executed sequence of decoded instructions, and is used to control when those decoded instructions can be committed. The RCQ tracks the sequence of updates to the SRT 74 made in response to the speculatively processed decoded instructions, which can then be copied to the ART 72 when the corresponding decoded instructions are committed.

Physical registers that are recorded in the ART 72 are marked as protected registers in the free list 78 and cannot be reallocated. However, when the ART 72 is updated such that a physical register is removed from the ART 72, i.e., because the architectural register which was mapped to that physical register is remapped to a different physical register, that physical register can then be freed for reallocation and is marked as free (available for allocation) in the free list 78. Hence, physical registers that are mapped to architectural registers may continue to be protected for a number of instruction cycles after they are no longer required because it may not be known that they are no longer required until the architectural register with which they are associated is remapped to a different physical register (which may occur several instruction cycles later).

Where instructions are late cracked by the post decode cracking circuitry, each entry of the ROB 70 may be associated with more than one micro operation. In order for that entry of the ROB 70 to commit, each micro operation associated with the entry of the ROB 70 must have resolved. In order to track resolution of the micro operations, each entry in the ROB 70 is provided with plural resolve bits which are set when the micro operations associated with that entry of the ROB 70 resolve. In the illustrated configuration 2 resolve bits are provided for each entry in the ROB 70. Where fewer than two micro operations are associated with an entry of the ROB 70 one of the resolution bits may be set in advance to indicate that only one resolve is required for that entry of the ROB 70. In some cases more than two micro operations may be generated for a given decoded instruction (corresponding to a single entry in the ROB 70). In such a situation the ROB is only able to track some (two) of the micro operations that are generated for the decoded instruction with resolution of the other micro operations being implicitly indicated when one of the tracked micro operations resolves (e.g. in a scenario where a producer micro operation can implicitly be considered resolved once the corresponding consumer micro operations is resolved). The micro operations may be marked (tagged) to indicate whether resolution of those micro operations should be marked in the ROB 70 on resolution or whether those micro operations are considered to resolve implicitly. For example, where a pair of micro operations are generated having a producer consumer relationship, the producer micro operation need not be tracked as there is no resolve associated with it and the consumer micro operation may be marked to indicate that there is a resolve associated with it. Hence, the producer micro operation may be considered to be implicitly resolved once the consumer micro operation resolves.

Where a late cracked decoded instruction results in a pair of micro operations having a producer-consumer data relationship the rename circuitry 13 assigns a transfer register to transfer data from the producer micro operation to the consumer micro operation. Where this data is retained in an architectural register subsequent to execution of the decoded instruction the transfer register is an architectural register and is assigned to a physical register as described above. However, where the data that is transferred from the producer micro operation is only required by the consumer micro operation (i.e., it is not assigned to an architectural register by the decoded instruction), the assignment of the physical register is not recorded in the SRT 74 or the ART 72. This is because there is no architectural register associated with the transfer register. The transfer register is assigned as an entry in the RCQ 76, for example, as illustrated in the RCQ entry 75 relating to physical register PR3. The assignment in the RCQ 76 is recorded using a predefined dummy register number (indicated as "VR" in FIG. 4) as the logical register number. The physical register associated with the transfer register is also marked as protected in the free list 78 and the entry in the RCQ 76 is recorded in the ROB 70 against the UID associated with that decoded instruction. Unlike the above case of a mapping between a physical register and an architectural register, in which the physical register is freed at a point of removal from the ART 72, when the micro operations associated with that decoded instruction commit, the transfer register is not recorded in the ART 72 and the physical register that has been allocated to the transfer register can be freed straight away resulting in the physical register being freed sooner than it would have been if it were assigned to one of the architectural registers. In other words, for RCQ entries not specifying the dummy register number VR, the register freed when an entry of the RCQ 76 commits would be the physical register specified in the entry of the ART 70 corresponding to the logical register specified in the committed entry of the RCQ 76. Instead, where a dummy register number VR is used in the entry of the RCQ 76, the physical register that is freed is the one identified in the committed entry of the RCQ 76 and not a corresponding register identified in the ART 70. This means that the physical register can be reclaimed earlier, which tends to improve performance because the physical register is not committed for as long and the pool of available PRs can be used more efficiently.

If a misprediction occurs, for example for a mispredicted branch instruction, then the register mappings may need to be rewound to an earlier point of execution to eliminate any updates to the SRT 74 and RCQ 76 which were made based on any incorrectly speculated decoded instructions. One approach for handling such mispredictions could be that the ART 72 is copied to the SRT 74 when a misprediction is detected and any RCQ or ROB entries beyond the commit pointers are flushed. However, in modern processors the mispredict point may be relatively far past the commit point and so this may waste a lot of correct processing between the commit point and the mispredict point. An alternative approach for handling mispredictions can be to try to recover the changes to the SRT 74 which were made due to the decoded instructions between the commit point and the mispredict point based on the RCQ 76. With this approach, when a misprediction is detected, any RCQ or ROB entries beyond the mispredict point can be flushed, but the entries corresponding to decoded instructions between the commit and the mispredict point are retained. The contents of the ART 72 could be copied to the SRT 74 when the misprediction is detected and then any RCQ entries which correspond to decoded instructions between the commit point and the mispredict point can be walked through to sequentially update the SRT 74 in response to each subsequent change of speculative register mapping which occurred when the decoded instructions between the commit point and the mispredict point were dispatched. The fact that a transfer register which was not assigned to an architectural register is not recorded in the ART 72 or the SRT 74 does not affect the handling of mispredictions because, from an architectural point of view, each decoded instruction either commits or does not commit as an atomic event. Hence, the entire decoded instruction has already committed or the entire decoded instruction is replayed and, consequently, is again late cracked by the post decode cracking circuitry.

Figure 5:
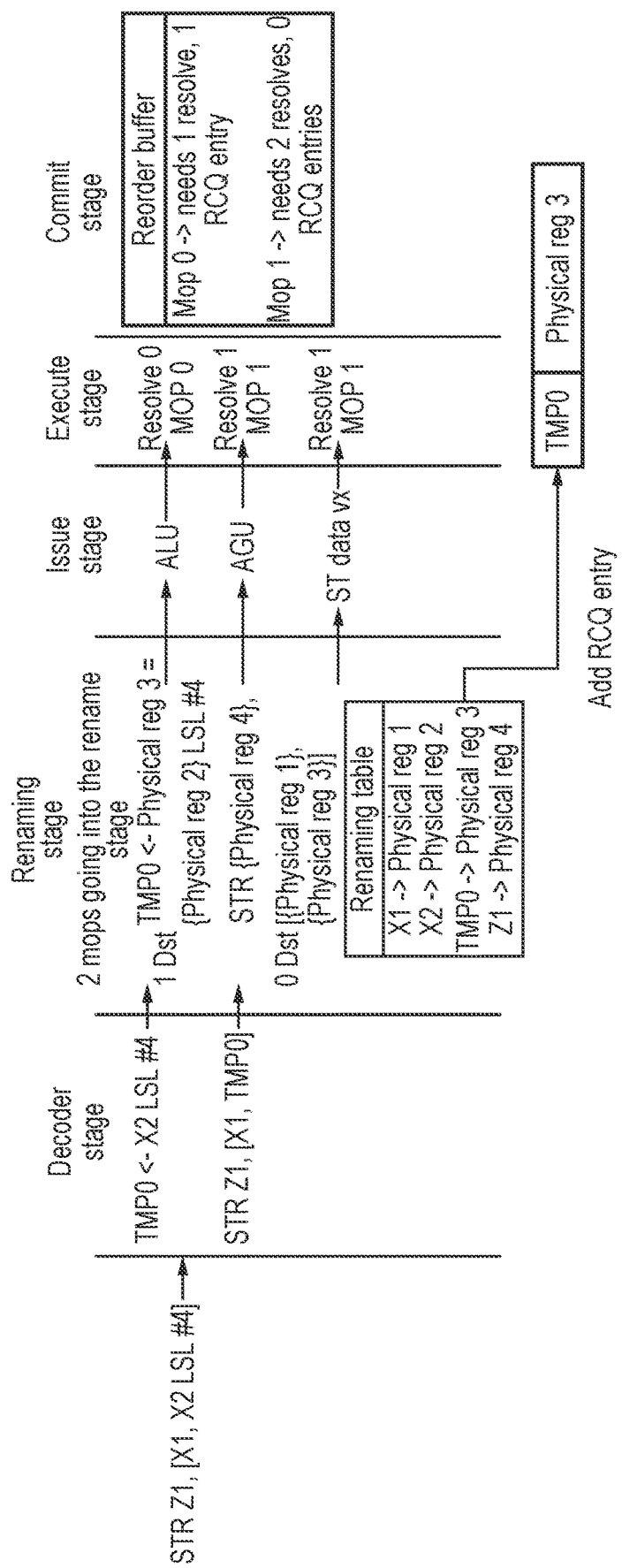
FIG. 5 schematically illustrates cracking an instruction at a decoder stage of a processing pipeline and at a processing pipeline stage subsequent to the decoder stage.

FIG. 5 schematically illustrates a comparative example of decoding an instruction to generate a plurality of micro operations in which cracking is provided at the decoder stage and at the renaming stage. However, in the comparative example, the rename stage is not able to crack instructions into micro operations having a producer consumer relationship. The instruction STR Z1, [X1, X2, LSL #4] is received by the decoder stage of the pipeline. This instruction takes the value in the register X2, left shifts this value by 4 places, adds the resulting value to X1 to generate a pointer to a storage location and stores the value of Z1 to that storage location. In this comparative example, an initial cracking of the instruction is performed at the decoder stage which receives the instruction and splits it into two decoded instructions. The first decoded instruction, TMP0<-X2 LSL #4 takes the value of X2 and left shifts it by four places before storing the result in TMP0. The second decoded instruction is a store operation, STR Z1, [X1, TMP0] which takes the values stored in X1 and TMP0 and adds them together to generate a storage location at which the value Z1 is stored.

The two decoded instructions are passed to the renaming stage which is capable of performing a further level of cracking of the decoded instructions into micro operations. The first decoded instruction, TMP0<-X2, LSL #4 results in a single micro operation in which TMP0 is mapped to physical register 3 and is recorded as a new mapping in the renaming table and a corresponding RCQ entry is generated and recorded in the ROB. X2 is mapped, based on the current mapping in the renaming table, to physical register 2 resulting in the micro operation {physical register 3}={physical register 2} LSL #4. The first decoded instruction is then passed to an issue queue at the issue stage and is recorded as a single entry in the reorder buffer which specifies a single resolve, i.e., the resolution of the left shift operation. The second decoded instruction STR Z1, [X1, TMP0] is passed to the renaming stage where X1 is mapped to physical register 1 and Z1 is mapped to physical register 4 resulting in the micro operation STR {physical register 4}, [{physical register 1}, {physical register 3}]. No new mappings are added to the renaming table for this decoded instruction as no output registers are specified. The second decoded instruction is then passed to an issue queue at the issue stage as two micro operations, one to generate the address and one to store the value in physical register 4 to that physical address. The second decoded instruction is recorded as a single entry in the reorder buffer requiring 2 resolves, one for each micro operation. The micro operations are then passed to the execute stage and, once they have resolved, the resolution of each micro operation is recorded in the reorder buffer and the decoded instructions are allowed to commit once all micro operations associated with those decoded instructions are resolved and once all micro operations preceding those micro operations in program counter order have committed.

In the comparative example of FIG. 5 the instruction is decoded into two entries in the reorder buffer one for each decoded instruction and requires a total of 3 resolves, one for the first entry in the reorder buffer and one for each of the two micro operations associated with the second decoded instruction. It is noted that in some configurations, the total number of resolves per entry in the reorder buffer may be limited. For example, in some configurations each entry in the reorder buffer may include at most two resolves. Hence, the decoded instructions generated at the decoder stage could not (in this comparative example) be combined as a single entry in the reorder buffer.

Figure 6:
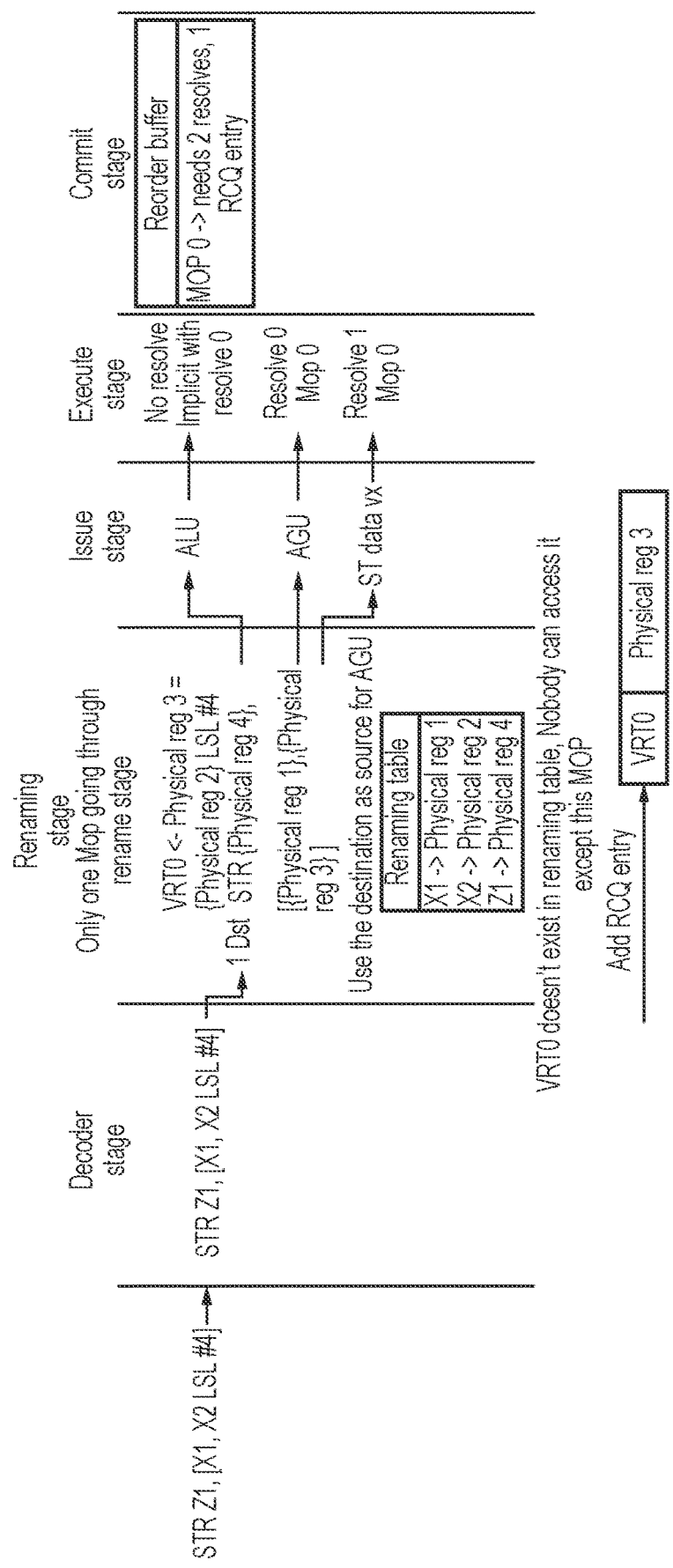
FIG. 6 schematically illustrates late cracking of an instruction into micro operations having a producer-consumer dependency.

FIG. 6 schematically illustrates the late cracking of an instruction using post decode cracking circuitry according to some configurations of the present techniques. The instruction that is provided to the decoder stage is the same instruction as the one described in relation to FIG. 5. In the case of FIG. 6, the renaming stage is comprised in post decode cracking circuitry that is capable of cracking a suitable decoded instruction into a plurality of micro-operations including at least one pair of micro-operations having a producer-consumer data dependency. The STR instruction provided to the decoder stage in FIG. 4 is one such instruction.

The decoder stage recognises that the STR instruction is of a type that can be late cracked by the post decode cracking circuitry and passes the instruction to the downstream components of the pipeline as a single decoded instruction. The post decode cracking circuitry, which comprises the renaming stage, receives the single decoded instruction and recognises that it is a type of instruction that can be split into a plurality of micro operations including a pair of micro-operations having a producer consumer relationship. The renaming stage therefore selects a physical register that can be used as a transfer register to transfer data produced by the producer micro operation for use by the consumer micro operation.

The STR instruction is split into three micro operations. The first micro operation is a producer micro operation that takes the value of X2 and left shifts by 4 places before storing the result in a transfer register (otherwise referred to a virtual register). The second micro operation is a consumer micro operation that takes the value stored in the transfer register, adds it to X1 and generates an address based on the result of the addition. The third micro operation is a store micro operation that stores the data value Z1 to a memory location identified by the address. In this case, the physical register that is allocated is not referenced subsequent to the execution of the consumer micro-operation. Hence, the physical register that is used as a transfer register does not need to be recorded in the renaming table.

The renamed operations are mapped, based on the current entries of the rename table, as follows VRT0<-{physical register 3}={physical register 2} LSL #4 which corresponds to a single producer micro operation; and STR {physical register 4}, [{physical register 1}, {physical register 3}] which corresponds to two micro operations, the consumer micro operation to generate the address and the third micro operation to store the data. It is noted that, because the transfer register is not required subsequent to the consumer operation, the transfer register is not added to the renaming table. Physical register 3 which is used for the transfer register is protected against reallocation by marking it as protected in the free list and including it as an entry in the RCQ as described in relation to FIG. 4.

The three micro-operations are passed to the issue stage and onto the execute stage. All three micro operations are recorded as a single entry in the reorder buffer for which two resolves are expected. The first resolve is recorded when the consumer micro operation completes. Because the consumer operation is recognised by the rename stage as being a consumer micro operation that is dependent on the producer micro operation, the producer micro operation and the consumer micro operation are issued sequentially, with the consumer micro operation following (issued after) the producer micro operation. The commit stage therefore treats the resolution of the consumer micro operation as being an implicit indication that the producer micro operation has resolved correctly. The second resolve is recorded when the third micro operation is completed. Hence, only two resolves are required and the entire original store instruction (as received by the decoder stage) can be tracked using a single entry in the reorder buffer (using the 2 resolve bits 71 as shown in FIG. 4 to track resolution of 3 uOPs).

Once the decoded instruction commits, i.e., once the reorder buffer has recorded the resolve associated with the micro operations and once all older instructions (occurring before the decoded instruction in program counter order) have committed, the transfer register, i.e., physical register 3, can be freed for use by other micro operations without recording the assignment in the ART as described in relation to FIG. 4.

Figure 7:
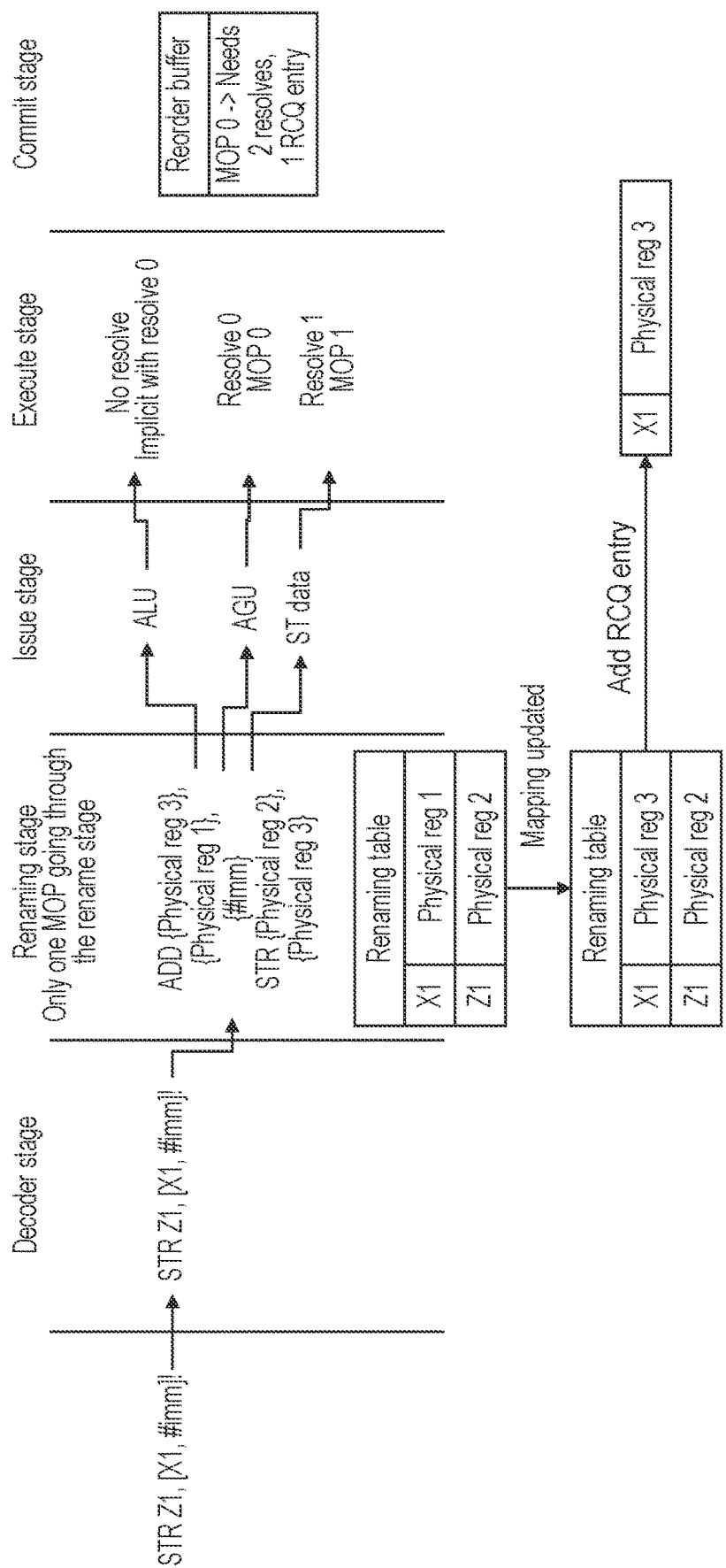
FIG. 7 schematically illustrates late cracking of an instruction into micro operations having a producer-consumer dependency.

FIG. 7 schematically illustrates late cracking of a further instruction by post decode cracking circuitry according to some configurations of the present techniques. The instruction is a store with pre-indexing and write back, STR Z1,

[X1, #imm]! which takes the input register X1 adds the immediate value #imm to the value of the input register and stores that value back to the input register before storing the value present in the architectural register Z1 to the location specified by an address generated from the value of X1 that has been written back. The instruction is received by the decoder circuitry which recognises that this instruction is of a type which the post decode cracking circuitry is capable of cracking into a plurality of micro operations. As a result, the decoder circuitry generates a single decoded instruction which is passed to the post decode cracking circuitry.

The post decode cracking circuitry, which comprises the renaming circuitry, cracks the decoded instruction into a plurality of micro-instructions including a pair of micro operations having a producer-consumer relationship. Because the produced data (i.e., the new value of X1) is required as an output of the instruction (i.e., the new value of X1 is written back to X1) the transfer register is mapped to an architectural register and is recorded in the renaming table. In particular, the post decode cracking circuitry generates a first operation ADD X1, X1, #imm. The rename circuitry reads the renaming table and identifies that X1 is currently mapped to {physical register 1}. The rename circuitry allocates a new physical register to the output of the add instruction, i.e., X1 is remapped to {physical register 3}. This mapping is updated in the renaming table and the first operation is output as a single producer micro operation ADD {physical register 3}, {physical register 1}, #imm which is passed to the issue stage as a single micro operation having an implicit resolve. The updated mapping is also added as a new RCQ entry which is tracked in the reorder buffer entry for this decoded instruction.

The second operation is a store instruction STR Z1, X1. The rename circuitry maps the source architectural registers Z1 and X1 to the physical registers according to the renaming table to generate the operation STR {physical register 2}, {physical register 3}. The second operation is cracked into two micro operations. The first is a consumer micro operation which generates an address based on the value stored in physical register 3. The second micro operation is a store micro operation which stores the value in physical register 2 to the address generated by the consumer micro operation.

The three micro-operations are passed to the issue stage and onto the execute stage. All three micro operations are recorded as a single entry in the reorder buffer for which two resolves are expected. The first resolve is recorded when the consumer micro operation completes. Because the consumer operation is recognised by the rename stage as being a consumer micro operation that is dependent on the producer micro operation, the producer micro operation and the consumer micro operation are issued sequentially, with the consumer micro operation following (issued after) the producer micro operation. The commit stage therefore treats the resolution of the consumer micro operation as being an implicit indication that the producer micro operation has resolved correctly. The second resolve is recorded when the third micro operation is completed. Hence, only two resolves are required and the entire original store instruction (as received by the decoder stage) can be tracked using a single entry in the reorder buffer.

Unlike the instruction illustrated in FIG. 6, once the decoded instruction commits, the transfer register is retained as a protected register in the free list and is recorded in the ART until, subsequently, the ART is updated to indicate that physical register 3 is no longer mapped to that architectural register.

Figure 8:
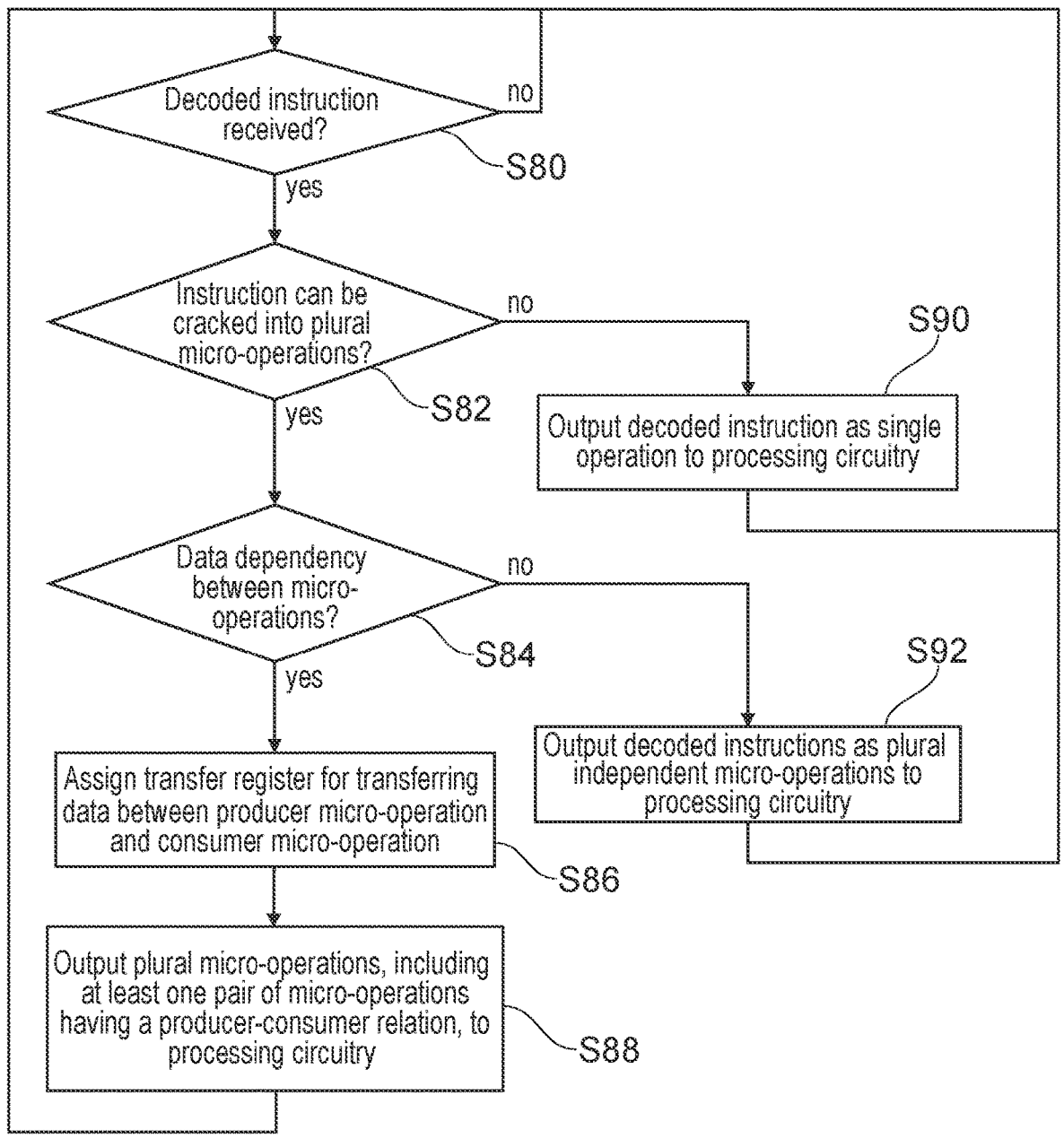
FIG. 8 schematically illustrates a sequence of steps carried out by post decode cracking circuitry.

FIG. 8 schematically illustrates a sequence of steps carried out by post decode cracking circuitry according to various configurations of the present techniques. Flow begins at step S80 where the post decode cracking circuitry determines if a decoded instruction has been received. If no then flow remains at step S80. If, at step S80, it was determined that a decoded instruction has been received, then flow proceeds to step S82, where it is determined if the decoded instruction is of a type that can be cracked into plural micro-operations. It the decoded instruction is not a type that can be cracked into a plurality of micro-operations then flow proceeds to step S90 where the decoded instruction is output as a single micro operation to the processing circuitry before flow returns to step S80. If, at step S82, it was determined that the decoded instruction is of a type that could be decoded into plural micro operations, then flow proceeds to step S84 where it is determined if there is a data dependency between any of the micro operations. If no, then flow proceeds to step S92, where the decoded instruction is output to the processing circuitry as plural independent micro-operations. Flow then returns to step S80. If, at step S84, it was determined that there is a data dependency between the micro operations, then flow proceeds to step S86 where a transfer register is assigned for transferring data between the producer micro operation and the consumer micro operation. Flow then proceeds to step S88 where the plurality of micro operations including at least one pair of micro operations having a producer consumer relationship are output to the processing circuitry before flow returns to step S80.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Figure 9:
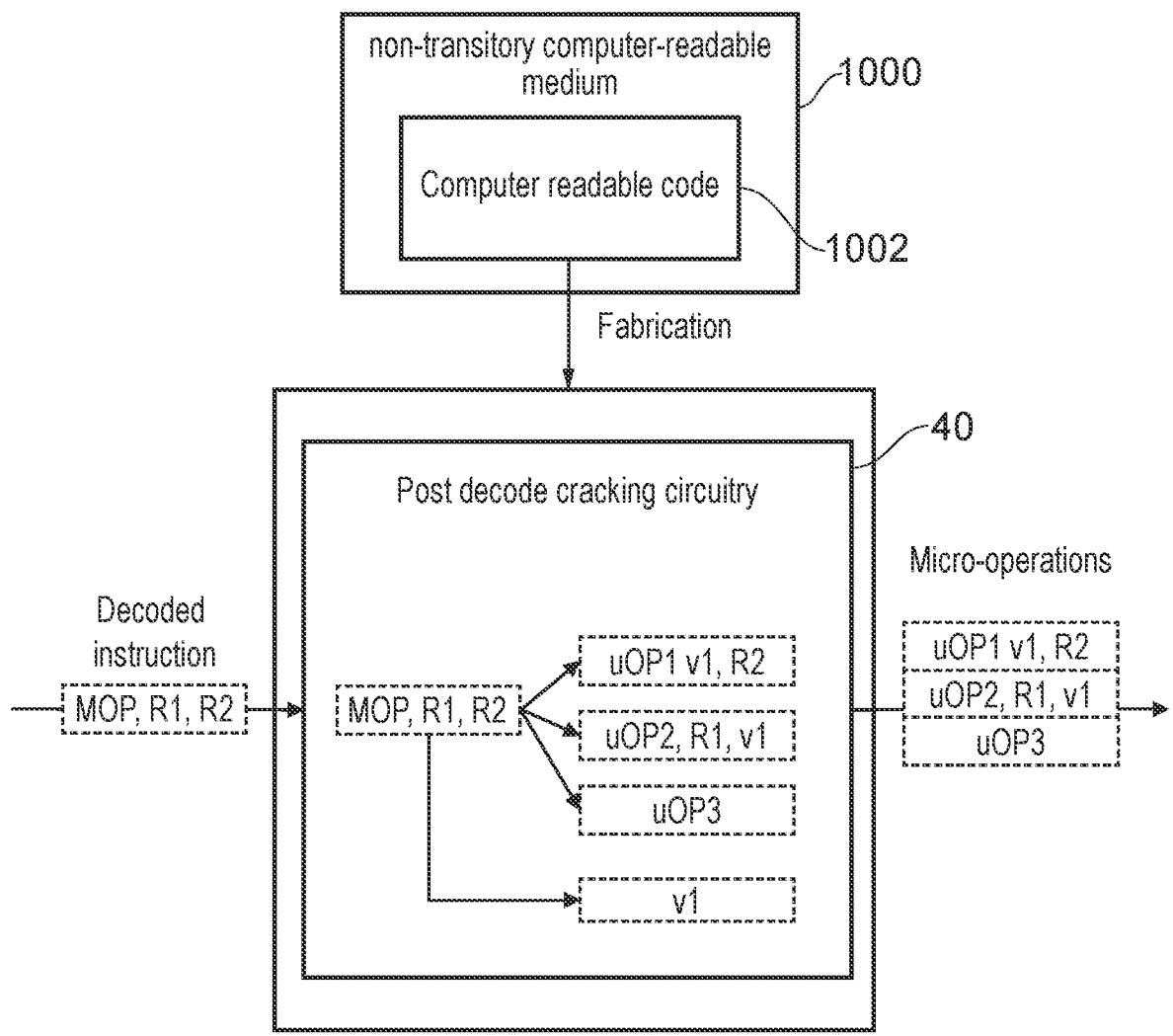
FIG. 9 schematically illustrates a non-transitory computer-readable storage medium comprising computer readable code for fabrication of an apparatus according to some configurations of the present techniques.

FIG. 9 schematically illustrates a non-transitory computer-readable medium comprising computer readable code for fabrication of a data processing apparatus according to various configurations of the present techniques. Fabrication is carried out based on computer readable code 1002 that is stored on a non-transitory computer-readable medium 1000. The computer-readable code can be used at one or more stages of a semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as a field programmable gate array (FPGA) to configure the FPGA to embody the configurations described hereinabove or to facilitate the fabrication of an apparatus implemented as one or more integrated circuits or otherwise that embody the configurations described hereinabove. By way of illustrative example, the fabricated design 1004 comprises a post decode cracking circuitry arranged to receive a decoded instruction and to output a plurality of micro operations, where the post decode cracking circuitry is capable of generating micro operations having a producer-consumer data relationship and assigning a transfer register to transfer data produced by the producer micro operation to the consumer micro operation as described in FIG. 2.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 10:
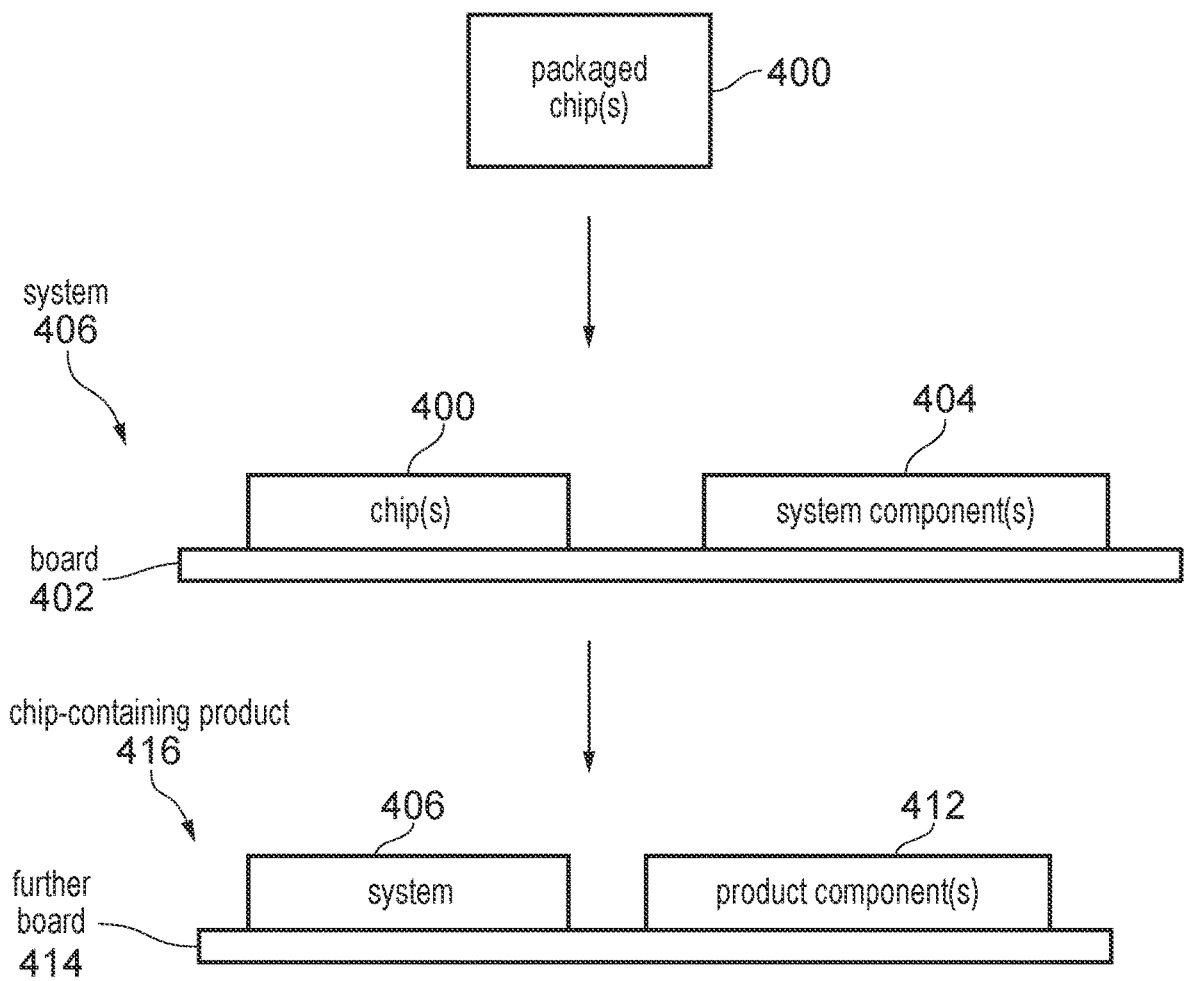
FIG. 10 schematically illustrates a system and chip-containing product according to some configurations of the present techniques.

As shown in FIG. 10, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

In brief overall summary there is provided an apparatus, method for data processing. The apparatus comprises post decode cracking circuitry responsive to receipt of decoded instructions from decode circuitry of a processing pipeline, to crack the decoded instructions into micro-operations to be processed by processing circuitry of the processing pipeline. The post decode cracking circuitry is responsive to receipt of a decoded instruction suitable for cracking into a plurality of micro-operations including at least one pair of micro-operations having a producer-consumer data dependency, to generate the plurality of micro-operations including a producer micro-operation and a consumer micro-operation, and to assign a transfer register to transfer data between the producer micro-operation and the consumer micro-operation.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the invention are also described by the following numbered clauses:

Clause 1. An apparatus comprising:
post decode cracking circuitry responsive to receipt of decoded instructions from decode circuitry of a processing pipeline, to crack the decoded instructions into micro-operations to be processed by processing circuitry of the processing pipeline,
wherein the post decode cracking circuitry is responsive to receipt of a decoded instruction suitable for cracking into a plurality of micro-operations including at least one pair of micro-operations having a producer-consumer data dependency, to generate the plurality of micro-operations including a producer micro-operation and a consumer micro-operation, and to assign a transfer register to transfer data between the producer micro-operation and the consumer micro-operation.

Clause 2. The apparatus of clause 1, comprising:
a plurality of physical registers; and
the post decode cracking circuitry comprises register renaming circuitry to dynamically select a subset of the plurality of physical registers to map to a set of architecturally defined registers for storing data values identifiable by the decoded instructions,
wherein the transfer register is one of the plurality of physical registers.

Clause 3. The apparatus of clause 2, wherein:
the register rename circuitry is configured to maintain a speculative mapping between the set of architecturally defined registers and the plurality of physical registers, and to maintain register commit information identifying which of the plurality of physical registers are protected against reallocation to a different architecturally defined register; and
the post decode cracking circuitry configured to assign a given physical register of the plurality of physical registers that is not, at a time of assignment, protected against reallocation as the transfer register and to identify the given physical register in the register commit information.

Clause 4. The apparatus of clause 3, wherein the register rename circuitry is responsive to identification that the decoded instruction is of a type for which the data transferred between the pair of micro-operations will not be required subsequent to execution of the consumer micro-operation, to omit assignment of the given physical register in the speculative mapping.

Clause 5. The apparatus of clause 3, wherein the post decode cracking circuitry is responsive to identification that the decoded instruction is of a type for which the data transferred between the pair of micro-operations is required subsequent to execution of the consumer micro-operation, to identify in the speculative mapping an architectural register of the set of architecturally defined registers to be mapped to the transfer register.

Clause 6. The apparatus of any preceding clause, comprising commit circuitry configured to track progress of the decoded instructions until the decoded instructions have been committed.

Clause 7. The apparatus of clause 6, wherein tracking the progress of the decoded instruction comprises tracking progress of a subset of the plurality of micro-operations.

Clause 8. The apparatus of clause 7, wherein the subset comprises at least the consumer micro-operation.

Clause 9. The apparatus of clause 7 or clause 8, wherein the subset excludes the producer micro-operation.

Clause 10. The apparatus of clause 9, wherein the commit circuitry is configured to treat resolution of the consumer micro-operation as an implicit indication that the producer micro-operation has resolved.

Clause 11. The apparatus of any of clauses 7 to 10, wherein the commit circuitry is configured to maintain a resolved operation queue comprising a plurality of resolved operation queue entries, each of the plurality of resolved operation queue entries corresponding to one of the decoded instructions and maintaining a plurality of bits indicative of the progress of the subset corresponding to that one of the resolved operation queue entries.

Clause 12. The apparatus of clause 11, wherein the plurality of bits comprises N bits, where N is a positive integer, and the plurality of micro-operations comprises M micro-operations, where M is a positive integer greater than N.

Clause 13. The apparatus of any of clause 6 to clause 12, comprising:
a plurality of physical registers; and
the post decode cracking circuitry comprises register renaming circuitry to dynamically select a subset of the plurality of physical registers to map to a set of architecturally defined registers for storing data values identifiable by the decoded instructions,
wherein the transfer register is one of the plurality of physical registers, and
wherein the commit circuitry is configured:
to maintain an architectural mapping between the set of architecturally defined registers and the plurality of physical registers at a current commit point; and
at a point at which the decoded instruction commits and in response to an indication that the transfer register is not mapped to one of the plurality of architecturally defined registers, to trigger release of the transfer register so that it can be reallocated.

Clause 14. The apparatus of any of clause 6 to clause 13 comprising:
a plurality of physical registers; and
the post decode cracking circuitry comprises register renaming circuitry to dynamically select a subset of the plurality of physical registers to map to a set of architecturally defined registers for storing data values identifiable by the decoded instructions,
wherein the transfer register is one of the plurality of physical registers, and
wherein the commit circuitry is configured:
to maintain an architectural mapping between the set of architecturally defined registers and the plurality of physical registers at a current commit point; and
at a point at which the decoded instruction commits and in response to an indication that the transfer register is mapped to one of the plurality of architecturally defined registers, to record a mapping between the transfer register and that one of the plurality of architecturally defined registers in the architectural mapping without triggering release of the transfer register for reallocation.

Clause 15. The apparatus of any preceding clause, further comprising the decoder circuitry, wherein the decoder circuitry is responsive to receipt of each instruction of a sequence of architecturally defined instructions to generate one or more of the decoded instructions.

Clause 16. The apparatus of clause 15, wherein the decoder circuitry is responsive to identification that at least one composite decoded instruction suitable for cracking by the post decode cracking circuitry can be generated from one of the sequence of architecturally defined instructions, to generate the composite decoded instruction corresponding to that one of the sequence of architecturally defined instructions and defer cracking of the composite decoded instruction to the post decode cracking circuitry.

Clause 17. The apparatus of any preceding clause, wherein the producer micro-operation is issued before the consumer micro-operation.

Clause 18. The apparatus of any preceding clause, wherein the apparatus is an out-of-order processing apparatus.

Clause 19. A system comprising:
the apparatus of any preceding clause, implemented in at least one packaged chip;
at least one system component; and
a board,
wherein the at least one packaged chip and the at least one system component are assembled on the board.

Clause 20. A chip-containing product comprising the system of clause 19 assembled on a further board with at least one other product component.

Clause 21. A non-transitory computer readable storage medium to store computer-readable code for fabrication of the apparatus of any clause 1 to clause 18.

We claim:
1. An apparatus comprising:
post decode cracking circuitry responsive to receipt of decoded instructions from decode circuitry of a processing pipeline, to crack the decoded instructions into micro-operations to be processed by processing circuitry of the processing pipeline,
wherein the post decode cracking circuitry is responsive to receipt of a decoded instruction suitable for cracking into a plurality of micro-operations including at least one pair of micro-operations having a producer-consumer data dependency, to generate the plurality of micro-operations including a producer micro-operation and a consumer micro-operation, and to assign a transfer register to transfer data between the producer micro-operation and the consumer micro-operation.

2. The apparatus of claim 1, comprising:
a plurality of physical registers; and
the post decode cracking circuitry comprises register renaming circuitry to dynamically select a subset of the plurality of physical registers to map to a set of architecturally defined registers for storing data values identifiable by the decoded instructions,
wherein the transfer register is one of the plurality of physical registers.

3. The apparatus of claim 2, wherein:
the register rename circuitry is configured to maintain a speculative mapping between the set of architecturally defined registers and the plurality of physical registers, and to maintain register commit information identifying which of the plurality of physical registers are protected against reallocation to a different architecturally defined register; and
the post decode cracking circuitry configured to assign a given physical register of the plurality of physical registers that is not, at a time of assignment, protected against reallocation as the transfer register and to identify the given physical register in the register commit information.

4. The apparatus of claim 3, wherein the register rename circuitry is responsive to identification that the decoded instruction is of a type for which the data transferred between the pair of micro-operations will not be required subsequent to execution of the consumer micro-operation, to omit assignment of the given physical register in the speculative mapping.

5. The apparatus of claim 3, wherein the post decode cracking circuitry is responsive to identification that the decoded instruction is of a type for which the data transferred between the pair of micro-operations is required subsequent to execution of the consumer micro-operation, to identify in the speculative mapping an architectural register of the set of architecturally defined registers to be mapped to the transfer register.

6. The apparatus of claim 1, comprising commit circuitry configured to track progress of the decoded instructions until the decoded instructions have been committed.

7. The apparatus of claim 6, wherein tracking the progress of the decoded instruction comprises tracking progress of a subset of the plurality of micro-operations.

8. The apparatus of claim 7, wherein the subset comprises at least the consumer micro-operation.

9. The apparatus of claim 7, wherein the subset excludes the producer micro-operation.

10. The apparatus of claim 9, wherein the commit circuitry is configured to treat resolution of the consumer micro-operation as an implicit indication that the producer micro-operation has resolved.

11. The apparatus of claim 7, wherein the commit circuitry is configured to maintain a resolved operation queue comprising a plurality of resolved operation queue entries, each of the plurality of resolved operation queue entries corresponding to one of the decoded instructions and maintaining a plurality of bits indicative of the progress of the subset corresponding to that one of the resolved operation queue entries.

12. The apparatus of claim 11, wherein the plurality of bits comprises N bits, where N is a positive integer, and the plurality of micro-operations comprises M micro-operations, where M is a positive integer greater than N.

13. The apparatus of claim 6, comprising:
a plurality of physical registers; and
the post decode cracking circuitry comprises register renaming circuitry to dynamically select a subset of the plurality of physical registers to map to a set of architecturally defined registers for storing data values identifiable by the decoded instructions,
wherein the transfer register is one of the plurality of physical registers, and
wherein the commit circuitry is configured:
to maintain an architectural mapping between the set of architecturally defined registers and the plurality of physical registers at a current commit point; and
at a point at which the decoded instruction commits and in response to an indication that the transfer register is not mapped to one of the plurality of architecturally defined registers, to trigger release of the transfer register so that it can be reallocated.

14. The apparatus of claim 6, comprising:
a plurality of physical registers; and
the post decode cracking circuitry comprises register renaming circuitry to dynamically select a subset of the plurality of physical registers to map to a set of architecturally defined registers for storing data values identifiable by the decoded instructions,
wherein the transfer register is one of the plurality of physical registers, and
wherein the commit circuitry is configured:
to maintain an architectural mapping between the set of architecturally defined registers and the plurality of physical registers at a current commit point; and
at a point at which the decoded instruction commits and in response to an indication that the transfer register is mapped to one of the plurality of architecturally defined registers, to record a mapping between the transfer register and that one of the plurality of architecturally defined registers in the architectural mapping without triggering release of the transfer register for reallocation.

15. The apparatus of claim 1, further comprising the decoder circuitry, wherein the decoder circuitry is responsive to receipt of each instruction of a sequence of architecturally defined instructions to generate one or more of the decoded instructions.

16. The apparatus of claim 15, wherein the decoder circuitry is responsive to identification that at least one composite decoded instruction suitable for cracking by the post decode cracking circuitry can be generated from one of the sequence of architecturally defined instructions, to generate the composite decoded instruction corresponding to that one of the sequence of architecturally defined instructions and defer cracking of the composite decoded instruction to the post decode cracking circuitry.

17. A system comprising:
the apparatus claim 1, implemented in at least one packaged chip;
at least one system component; and
a board,
wherein the at least one packaged chip and the at least one system component are assembled on the board.

18. A chip-containing product comprising the system of claim 17 assembled on a further board with at least one other product component.

19. A method of operating an apparatus, the method comprising:
in response to receipt of decoded instructions from decode circuitry of a processing pipeline, cracking the decoded instructions into micro-operations to be processed by processing circuitry of the processing pipeline,
in response to receipt of a decoded instruction suitable for cracking into a plurality of micro-operations including at least one pair of micro-operations having a producer-consumer data dependency, generating the plurality of micro-operations including a producer micro-operation and a consumer micro-operation, and assigning a transfer register to transfer data between the producer micro-operation and the consumer micro-operation.

20. A non-transitory computer readable storage medium to store computer-readable code for fabrication of an apparatus comprising:
post decode cracking circuitry responsive to receipt of decoded instructions from decode circuitry of a processing pipeline, to crack the decoded instructions into micro-operations to be processed by processing circuitry of the processing pipeline,
wherein the post decode cracking circuitry is responsive to receipt of a decoded instruction suitable for cracking into a plurality of micro-operations including at least one pair of micro-operations having a producer-consumer data dependency, to generate the plurality of micro-operations including a producer micro-operation and a consumer micro-operation, and to assign a transfer register to transfer data between the producer micro-operation and the consumer micro-operation.

* * * * *